3,061,607
Patented Oct. 30, 1962

3,061,607
3β,11α-HYDROXYLATED PREGNANES AND PROCESS FOR PREPARING SAME
Eugene P. Oliveto, Glen Ridge, and Hans Reimann, Bloomfield, N.J., assignors to Schering Corporation, Bloomfield, N.J., a corporation of New Jersey
No Drawing. Filed Mar. 9, 1961, Ser. No. 94,441
16 Claims. (Cl. 260—239.55)

This invention relates to a new process for the preparation of physiologically active 9,11-disubstituted pregnanes and to certain intermediates employed therein. Specifically, it relates to the conversion of the readily available starting materials, gentrogenin and correlogenin by the sequence of reactions disclosed and employing the novel intermediates more particularly described to 11α-hydroxy-pregnane intermediates represented by the general formula:

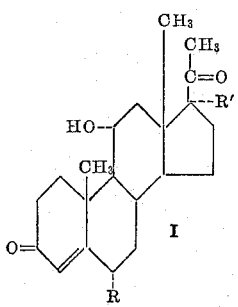

wherein R is CH₃, F or Cl and R' is H or OH, which may in turn be transformed as described below to the aforesaid 9,11-disubstituted pregnanes.

These compounds illustrated by (I) are readily transformed to the corresponding 9(11)-dehydro compounds via their 11-mesylates or 11-tosylates as described in the chemical literature. The 9(11)-dehydropregnanes thus obtained are then converted to useful progestational compounds by addition to the 9(11)-double bond to give 9α,11β-dihaloprogesterones as described in Reimann et al. patent applications S.N. 817,051, now Patent No. 3,009,- 930, and S.N. 817,054, filed June 1, 1959, and to give 9α-halo-11β-hydroxy and 9α-halo-11β-acyloxyprogesterones in the manner of Bergstrom et al., J.A.C.S., 81, 4432 (1959).

The novel intermediates of our invention which may be transformed by our novel process to the 11α-hydroxy-pregnanes of Formula I as described below may be represented by the general formula:

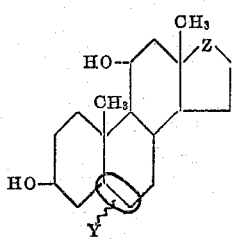

wherein Z represents a member of the group consisting of (a)    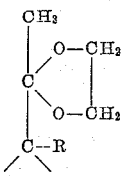

and
(b)    

with R being a member of the group consisting of H and OH; Y represents a configuration about the 5 and 6 carbon atoms selected from the group consisting of (c)    

(d)    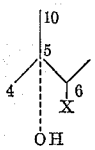

and
(e)    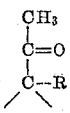

with X being a member of the group consisting of F, Cl and CH₃ with the provision that when Y represents configuration (c), Z must represent configuration (b).

These intermediates may be prepared for example in the manner of the following general reaction sequence. In the reaction it is to be understood that although the group noted at the 3 and 11 positions of the 5-pregnene-3β,11α-diol and 5-pregnene-3β,11α,17α-triol-20-one starting materials is hydroxyl it is within the scope of the invention that the said group also be an ester function such as acetyl, formyl, butyryl and the like.

In the general preparation gentrogenin is first converted to 11α-hydroxydiosgenin and thence to 5,16-pregnadiene-3β,11α-diol-20-one diacetate. The latter compound is converted to 5-pregnene-3β,11α-diol-20-one and to 5-pregnene-3β,11α,17α-triol-20-one (see, for example, Halpern et al., J.A.C.S., vol. 81, pages 439–441, January 20, 1959). These compounds serve as suitable starting materials for the preparative sequence of our invention.

Thus, in the manner of our invention 5-pregnene-3β,11α-diol-20-one is converted to the 20-ketal by the use of ethylene/glycol in a solvent such as benzene in the presence of an acid catalyst such as p-toluenesulfonic acid, the 5,6-double bond is then epoxidized with a reagent such as perphthalic acid and the 5α,6α-epoxide is separated by a suitable procedure such as chromatography. The resulting 5α,6α-oxidoallopregnane-3β,11α-diol-20-one 20-ethylene ketal is treated with methylmagnesium iodide to give 6β-methylallopregnane-3β,5α,11α-triol-20-one 20-ethylene ketal or with a hydrogen halide such as hydrogen fluoride or hydrogen chloride to give 6β-fluoro- and 6β-chloroallopregnane-3β,5α,11α-triol-20-one 20-ethylene ketal. The ketal function is then removed by treatment with acid such as hot aqueous acetic acid to give the 6β-substituted allopregnane-3β,5α,11α-triol-20-ones. Reaction of the latter novel intermediate under controlled conditions with an oxidizing agent, for example with N-bromoacetamide at low temperatures, gives the corresponding 3-ketones. These may be dehydrated, and simultaneously or subsequently the C-6 substituent may be epimerized to the 6α-configuration by treatment with strong acid or base to give 6α-methyl, 6α-fluoro- and 6α-chloro-4-pregnene-11α-ol-3,20-dione.

Similarly, 5-pregnene-3β,11α,17α-triol-20-one is converted to the 20-ethyleneketal, epoxidized to give the 5α,6α-oxide which is then allowed to react with, for example, methylmagnesium iodide, hydrogen fluoride or hydrogen chloride to give respectively 6β-methyl-, 6β-fluoro- and 6β-chloroallopregnane-3β,5α,11α,17α-tetraol-20-one 20-ethylene ketal. The ketal group is then hydrolyzed, the 3β-hydroxy function oxidized and the resulting 3-ketosteroids dehydrated and the C-6 substituent isomerized to give 6α-methyl-, 6α-fluoro- and 6α-chloro-4-pregnene-11α,17α-diol-3,20-dione.

Alternatively, for the preparation of the 6-halopregnanes the 20-keto group does not have to be protected as the ketal. Thus 5-pregnene-3β,11α-diol-20-one and 5-pregnene-3β,11α,17α-triol-20-one may be directly epoxidized with a reagent such as perphthalic acid and the corresponding 5α,6α-oxide purified by chromatography. The oxido compounds thus obtained are treated with hydrogen fluoride or hydrogen chloride to give the corresponding 6β-fluoro-and 6β-chloroallopregnane-3β,5α,11α-triol-20-one and 6β-fluoro- and 6β-chloroallopregnane-3β,5α,11α,17α-tetraol-20-one, identical to the compounds obtained with ketal protection of the 20-ketone.

Although the following examples illustrate one method of preparing the novel intermediates and the process of the invention, it is to be understood that their purpose is purely by way of illustration and it is not intended in any way to limit the scope of the invention which may be determined only by reference to the appended claims.

EXAMPLE 1

*5-Pregnene-3β,11α,-Diol-20-One 20-Ethylene Ketal*

To a solution of 5.0 g. of 5-pregnene-3β,11α-diol-20-one in 200 ml. of benzene and 10 ml. of ethylene glycol is added 0.2 g. of p-toluenesulfonic acid and the mixture heated under reflux in a flask provided with a Dean-Starke trap for six hours. The cooled reaction mixture is washed with 1% sodium bicarbonate solution and water. The dried benzene solution is concentrated to give the desired product.

EXAMPLE 2

*5α,6α-Oxidoallopregnane-3β,11α-Diol-20-One Ethylene Ketal*

To a solution of 5.0 g. of the compound of Example 1 in 150 ml. of chloroform is added a solution of 3.8 g. of monoperphthalic acid in 42 ml. of ether and the mixture allowed to stand at 0° for 48 hours. The precipitate is then filtered off and the filtrate washed with aqueous sodium bicarbonate and water. The dried solution is concentrated to a residue consisting of the desried 5α,6α-epoxide in admixture with the 5β,6β-epoxide. The mixture is chromatographed on Florisil and the steroid eluted with mixtures of hexane, ether and acetone. Appropriate fractions are combined to give the desired pure 5α,6α-oxidopregnane.

EXAMPLE 3

*6β-Methylallopregnane-3β,5α,11α-Triol-20-One 20-Ethylene Ketal*

A solution of 4.0 g. of the compound of Example 2 in 75 ml. of purified tetrahydrofuran is added slowly with stirring under nitrogen to a solution of methylmagnesium iodide prepared from 2.5 g. of magnesium and 10 ml. of methyl iodide in ether. To the reaction mixture is added 200 ml. of benzene and 20 ml. of tetrahydrofuran. The ether is distilled off and the mixture then allowed to heat under reflux for 18 hours. The reaction mixture is cooled in ice, diluted with ether and treated dropwise with a solution of 34 g. of ammonium chloride in 140 ml. of water. The organic layer is separated, washed with water, dried and concentrated. The residue is crystallized from acetone-ether to give the desired product.

EXAMPLE 4

*6β-Methylallopregnane-3β,5α,11α-Triol-20-One*

A solution of 5 g. of the compound of Example 3 in 200 ml. of 80% aqueous acetic acid is heated at 90° for two hours, then poured into ice-water. The precipitate is filtered and crystallized from acetone-hexane to give the desired product.

EXAMPLE 5

*6β-Methylallopregnane-5α,11α-Diol-3,20-Dione*

A solution of 1.0 g. of the compound of Example 4 in 10 ml. of acetone and one ml. of water is cooled to 0° and 0.5 g. of N-bromoacetamide is added. The mixture is kept at 3–5° for two hours, then the excess reagent is destroyed by the addition of a solution of 2 g. of sodium sulfite in 10 ml. of water. The mixture is poured into water and the resulting precipitate filtered and crystallized from acetone-hexane to give the desired material.

EXAMPLE 6

*6α-Methyl-4-Pregnene-11α-Ol-3,20-Dione*

To a solution of 2 g. of the compound of Example 5 in 50 ml. of methanol is added 4 ml. of a 5% solution of potassium hydroxide in methanol and the mixture refluxed under nitrogen for one hour. The solution is slightly acidified with acetaic acid, diluted with water and concentrated under reduced pressure to give the crystalline compound of this example.

EXAMPLE 7

*5α,6α-Oxidoallopregnane-3β,11α-Diol-20-One*

Five grams of 5-pregnene-3β,11α-diol-20-one is epoxidized with perphthalic acid and the product purified according to the procedure of Example 2. The product is crystallized from acetone-hexane.

EXAMPLE 8

*6β-Fluoroallopregnane-3β,5α,11α-Triol-20-One 20-Ethylene Ketal*

To a solution of 500 mg. of the compound of Example 2 in 10 ml. of alcohol-free chloroform contained in a polyethylene bottle and chilled to −15° is added a solution of about 100 mg. of hydrogen fluoride in 5 ml. of chloroform and the mixture stirred at −15° for 4 hours. The solution is washed with aqueous sodium bicarbonate and water, dried and concentrated. The residue is crystallized from methylene chloride-pentane to give the desired compound.

EXAMPLE 9

*6β-Fluoroallopregnane-3β,5α,11α-Triol-20-One*

To a solution of 1.0 g. of the compound of Example 8 in 10 ml. of acetone and one ml. of water is added 0.05 ml. of conc. hydrochloric acid and the solution refluxed for 30 minutes. It is then poured into water and the product filtered and crystallized from aqueous acetone to give the compound of this example.

Alternatively, 1.0 g. of the compound of Example 7 is treated with hydrogen fluoride according to the procedure of Example 8. The reaction is worked up as described and the product crystallized from aqueous acetone.

EXAMPLE 10

*6β-Fluoroallopregnane-5α,11α-Diol-3,20-Dione*

A solution of 1.0 g. of the compound of Example 9 in acetone is treated with N-bromoacetamide according to the procedure of Example 5. The product is crystallized from acetone-hexane.

EXAMPLE 11

*6α-Fluoro-4-Pregnene-11α-Ol-3,20-Dione*

A solution of 0.50 g. of the compound of Example 10 in 10 ml. of chloroform is chilled to 0° and saturated with hydrogen chloride gas. The solution is allowed to stand in the cold for two hours, then poured with vigorous stirring into ice cold sodium bicarbonate solution. The mixture is extracted with methylene chloride and the extracts washed with water, dried and concentrated to a residue which is crystallized from acetone-hexane to give the compound of this example.

EXAMPLE 12

6β-Chloroallopregnane-3β,5α,11α-Triol-20-One

To a solution of 200 mg. of the compound of Example 7 in 10 ml. of chloroform, chilled to 0°, is added a solution of 95 mg. of hydrogen chloride in 1 ml. of tetrahydrofuran. The mixture is allowed to stand at room temperature for two hours, then washed with dilute sodium bicarbonate solution and water. The dried organic solution is concentrated and the residue crystallized from acetone-hexane to give the desired compound.

EXAMPLE 13

6β-Chloroallopregnane-5α,11α-Diol-3,20-Dione

A 100 mg. sample of the compound of Example 12 is oxidized with N-bromoacetamide according to the procedure of Example 5 to give the desired compound. The product may be crystallized from methylene chloride-hexane.

EXAMPLE 14

6α-Chloro-4-Pregnene-11α-Ol-3,20-Dione

Treatment of 50 mg. of the compound of Example 13 with hydrogen chloride according to the procedure of Example 11 gives the compound of this example.

EXAMPLE 15

5-Pregnene-3β,11α,17α-Triol-20-One 20-Ethylene Ketal

Substitute 5-pregnene-3β,11α,17α-triol-20-one for 5-pregnene-3β,11α-diol-20-one in the process of Example 1 to obtain the product of this example.

EXAMPLE 16

5α,6α-Oxidoallopregnane-3β,11α,17α-Triol-20-One 20-Ethylene Ketal

Substitute the compound of Example 15 above in the process of Example 2 to obtain the product of this example.

EXAMPLE 17

6β-Methylallopregnane-3β,5α,11α,17α-Tetrol-20-One 20-Ethylene Ketal

Substitute the compound of Example 16 above in the process of Example 3 to obtain the product of this example.

EXAMPLE 18

6β-Methylallopregnane-3β,5α,11α,17α-Tetrol-20-One

Substitute the compound of Example 17 in the process of Example 4 to obtain the product of this example.

EXAMPLE 19

6β-Methylallopregnane-5α,11α,17α-Triol-3,20-Dione

Substitute the compound of Example 18 in the process of Example 5 to obtain the product of this example.

EXAMPLE 20

6α-Methyl-4-Pregnene-11α,17α-Diol-3,20-Dione

Substitute the compound of Example 19 in the process of Example 6 to obtain the product of this example.

EXAMPLE 21

5α,6α-Oxidoallopregnane-3β,11α,17α-Triol-20-One

Substitute 5-pregnene-3β,11α,17α-triol-20-one in the process of Example 2 to obtain the product of this example.

EXAMPLE 22

6β-Fluoroallopregnane-3β,5α,11α,17α-Tetrol-20-One 20-Ethylene Ketal

Substitute the compound of Example 16 in the process of Example 8 to obtain the product of this example.

EXAMPLE 23

6β-Fluoroallopregnane-3β,5α,11α,17α-Tetrol-20-One

Substitute the compound of Example 22 in the process of the first part of Example 9 to obtain the product of this example.

EXAMPLE 24

6β-Fluoroallopregnane-5α,11α,17α-Triol-3,20-Dione

Substitute the compound of Example 23 in the process of Example 5 to obtain the product of this example.

EXAMPLE 25

6α-Fluoro-4-Pregnene-11α,17α-Diol-3,20-Dione

Substitute the compound of Example 24 in the process of Example 11 to obtain the product of this example.

EXAMPLE 26

6β-Chloroallopregnane-3β,5α,11α,17α-Tetrol-20-One

Substitute the compound of Example 21 in the process of Example 12 to obtain the product of this example.

EXAMPLE 27

6β-Chloroallopregnane-5α,11α,17α-Triol-3,20-Dione

Substitute the compound of Example 26 in the process of Example 5 to obtain the product of this example.

EXAMPLE 28

6α-Chloro-4-Pregnene-11α,17α-Diol-3,20-Dione

Substitute the compound of Example 27 in the process of Example 11 to obtain the product of this example.

We claim:

1. An intermediate for the preparation of therapeutically active 9,11-disubstituted pregnanes selected from the group consisting of compounds of the general formula:

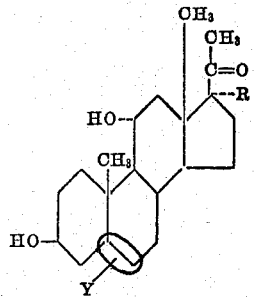

wherein R represents a member of the group consisting of H and OH; Y represents a configuration about the 5 and 6 carbon atoms selected from the group consisting of

and

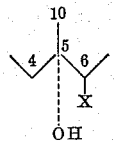

and X represents a member of the group consisting of F, Cl and CH₃.

2. 5α,6α-oxidoalloprenane - 3β,11α - diol - 20 - one 20-ethylene ketal.

3. 6β-methylallopregnane-3β,5α,11α - triol - 20 - one 20-ethylene ketal.

4. 5α,6α-oxidoallopregnane-3β, 11α-diol-20-one.

5. 6β-fluoroallopregnane-3β,5α,11α - triol - 20 - one 20-ethylene ketal.

6. 6β-fluoroallopregnane-3β,5α,11α-triol-20-one.

7. 6β-chloroallopregnane-3β,5α,11α-triol-20-one.

8. 6β-methylallopregnane-3β,5α,11α-triol-20-one.

9. 5-pregnene-3β,11α,17α - triol - 20 - one 20 - ethylene ketal.

10. 5α,6α-oxidoallopregnane-3β,11α,17α-triol - 20 - one 20-ethylene ketal.

11. 6β-methylallopregnane - 3β,5α,11α,17α - tetrol - 20-one 20-ethylene ketal.

12. 6β-methylallopregnane-3β,5α,11α,17α - tetrol - 20-one.

13. 5α,6α-oxidoallopregnane-3β,11α,17α-triol-20-one.

14. 6β-fluoroallopregnane-3β,5α,11α,17α - tetrol-20-one 20-ethylene ketal.

15. 6β-fluoroallophegnane - 3β,5α,11α,17α - tetrol - 20-one.

16. 6β-chloroallophegnane - 3β,5α,11α,17α - tetrol - 20-one.

References Cited in the file of this patent

UNITED STATES PATENTS

| | | |
|---|---|---|
| 2,838,501 | Campbell et al. | June 10, 1958 |
| 2,838,528 | Campbell et al. | June 10, 1958 |
| 2,842,572 | Herr et al. | July 8, 1958 |
| 2,897,217 | Spero | July 28, 1959 |
| 2,971,964 | Rothman et al. | Feb. 14, 1961 |

OTHER REFERENCES

Loewenthal: Tetrahedron, vol. 6, No. 4, June 1959, pages 295–297.